US008980465B2

(12) United States Patent  
Ahn

(10) Patent No.: US 8,980,465 B2
(45) Date of Patent: Mar. 17, 2015

(54) BATTERY PACK

(75) Inventor: Laurence Sang-Kyu Ahn, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 121 days.

(21) Appl. No.: 13/307,310

(22) Filed: Nov. 30, 2011

(65) Prior Publication Data

US 2012/0171557 A1  Jul. 5, 2012

Related U.S. Application Data

(60) Provisional application No. 61/429,854, filed on Jan. 5, 2011.

(51) Int. Cl.
*H01M 2/30* (2006.01)
*H01M 2/02* (2006.01)
*H01M 2/06* (2006.01)
*H01M 2/10* (2006.01)
*H01M 2/34* (2006.01)

(52) U.S. Cl.
CPC ............ *H01M 2/021* (2013.01); *H01M 2/0212* (2013.01); *H01M 2/06* (2013.01); *H01M 2/1061* (2013.01); *H01M 2/30* (2013.01); *H01M 2/34* (2013.01)
USPC ........... 429/178; 429/179; 429/162; 429/163; 429/176; 429/177

(58) Field of Classification Search
USPC .................. 429/162, 163, 176, 177, 178, 179
See application file for complete search history.

(56) References Cited

U.S. PATENT DOCUMENTS

2007/0207377 A1* 9/2007 Han et al. ........................ 429/162
2008/0299453 A1 12/2008 Shinyashiki et al.
2009/0155631 A1* 6/2009 Baek et al. ........................ 429/7
2009/0176153 A1* 7/2009 Yoon et al. ..................... 429/162

(Continued)

FOREIGN PATENT DOCUMENTS

| DE | 10-2009-010794 A1 | 9/2010 |
| DE | 10-2009-011523 A1 | 9/2010 |
| EP | 2083460 A1 | 1/2009 |
| JP | 11-007983 | 1/1999 |

(Continued)

OTHER PUBLICATIONS

Extended European Search Report issued by the European Patent Office on Jun. 14, 2012 in the examination of European Patent Application No. 12150197.7 which corresponds to U.S. Appl. No. 61/429,854.

*Primary Examiner* — Mark F Huff
*Assistant Examiner* — Olatunji Godo
(74) *Attorney, Agent, or Firm* — Robert E. Bushnell, Esq.

(57) ABSTRACT

A battery pack that includes a battery cell having a positive and negative electrode terminal extending from a side of the battery cell. The positive and negative electrode terminal each have a non-exposed surface and an exposed surface. The battery pack also includes a case that includes a first case and a second case. The first case includes a first terminal guide unit to accommodate the positive electrode terminal with the non-exposed surface of the positive electrode terminal facing the first terminal guide. The second case includes a second terminal guide unit that accommodates the negative electrode terminal. The non-exposed surface of the negative electrode terminal faces the second terminal guide. The first case and the second case are coupled together with the battery cell positioned between the first case and the second case.

18 Claims, 7 Drawing Sheets

(56) References Cited

U.S. PATENT DOCUMENTS

| | | | |
|---|---|---|---|
| 2009/0325043 A1* | 12/2009 | Yoon et al. | 429/90 |
| 2010/0104927 A1 | 4/2010 | Albright | |
| 2010/0266883 A1 | 10/2010 | Koetting et al. | |
| 2011/0003197 A1 | 1/2011 | Kritzer et al. | |
| 2011/0014512 A1* | 1/2011 | Amagai et al. | 429/159 |
| 2012/0135288 A1 | 5/2012 | Meintschel | |

FOREIGN PATENT DOCUMENTS

| | | |
|---|---|---|
| JP | 2001-102014 | 4/2001 |
| KR | 10-2005-0096710 | 10/2005 |
| KR | 10-2006-0094231 | 8/2006 |
| WO | 2006101342 A1 | 9/2006 |
| WO | WO 2009107657 * | 9/2009 |
| WO | 2010/099905 A1 | 9/2010 |

* cited by examiner

BATTERY PACK

CLAIM OF PRIORITY

This application claims priority to and the benefit of Provisional Application No. 61/429,854, filed on Jan. 5, 2011, in The United States Patent and Trademark Office, the entire content of which is incorporated herein by reference.

BACKGROUND OF THE INVENTION

1. Field of the Invention

The present invention relates to a battery pack.

2. Description of the Related Art

Secondary batteries represent cells that can be recharged and discharged, unlike primary batteries that cannot be recharged. The secondary batteries are widely used in not only high-technology small electronic devices including mobile phones, personal digital assistants (PDAs), notebook computers or the like, but also used in large scale applications such as energy storage systems.

When a positive electrode and a negative electrode are short-circuited during the manufacture and delivery of these secondary batteries, large-scale accidents such as heat emission or ignition in the secondary battery may occur. When such unintentional short-circuits occur, not only can damage occur to the battery but also people may potentially be injured.

The above information disclosed in this Related Art section is only for enhancement of understanding of the background of the invention and therefore it may contain information that does not form the prior art that is already known to a person of ordinary skill in the art.

SUMMARY OF THE INVENTION

Embodiments provide for a battery pack that prevents short-circuits during the manufacture and delivery of secondary batteries According to an aspect of the present invention, a battery pack that may include a battery cell having a first electrode terminal extending from a side of the battery cell and a second electrode terminal extending from the side of the battery cell, said first electrode terminal having a non-exposed surface and an exposed surface; and a case, having a first case having a first terminal guide unit to accommodate the first electrode terminal, said non-exposed surface of the first electrode terminal facing the first terminal guide unit; and a second case, wherein the first case and the second case may be coupled together with the battery cell positioned between the first case and the second case.

The second case may further include a second terminal guide unit to accommodate the second electrode terminal, said second electrode terminal having a non-exposed surface and an exposed surface with the non-exposed surface of the second electrode terminal facing the second terminal guide unit.

The first terminal guide unit and the second terminal guide unit may face in opposite directions to each other.

The first terminal guide unit may include a protrusion part extending from an end of the first terminal guide unit and that protrudes along an exposed direction of a side of the first electrode terminal at a height approximately equal to or greater than a thickness of the first electrode terminal.

The protrusion part may be disposed at an end of the first terminal guide unit closest to the second electrode terminal.

The first terminal guide unit may include a second protrusion part extending from an end of the first terminal guide unit and that protrudes along an exposed direction of a side of the first electrode terminal at a height approximately equal to or greater than a thickness of the first electrode terminal.

The second protrusion part may be disposed at an end of the first terminal guide unit furthest from the second electrode terminal.

The first terminal guide unit of the first case may include a receiving surface to accommodate a first cushion part, said first cushion part is composed of a non-conductive material, said first cushion part faces and comes in contact with the non-exposed surface of the first electrode terminal.

The second terminal guide unit of the second case may include a receiving surface to accommodate a second cushion part, said second cushion part are composed of a non-conductive material, said second cushion part faces and comes in contact with the non-exposed surface of the second electrode terminal.

The battery pack may further include a first conductive plate coupled to the exposed surface of the first electrode terminal.

The first conductive plate may be composed of a material that conducts electricity and absorbs and dissipates heat.

The battery pack may further include a second conductive plate coupled to the exposed surface of the second electrode terminal.

The second conductive plate may be composed of a material that conducts electricity and absorbs and dissipates heat.

The first cushion part may be composed of a material having heat-resistant and elastic properties.

The second cushion part may be composed of a material having heat-resistant and elastic properties.

The first cushion part may be composed of silicon.

The second cushion part may be composed of silicon.

The first conductive plate may be composed of copper.

The second conductive plate may be composed of copper.

The second terminal guide unit may include a protrusion part extending from an end of the second terminal guide unit and that protrudes along an exposed direction of a side of the second electrode terminal at a height approximately equal to or greater than a thickness of the second electrode terminal. The protrusion part may be disposed at an end of the second terminal guide unit closest to the first electrode terminal.

The second terminal guide unit may also have a second protrusion part extending from an end of the second terminal guide unit and that protrudes along an exposed direction of a side of the second electrode terminal at a height approximately equal to or greater than a thickness of the second electrode terminal. The second protrusion part may be disposed at an end of the second guide unit furthest from the first electrode terminal.

The first conductive plate may be screw-engaged to the first terminal guide unit.

The first case and the second case may have a same shape.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
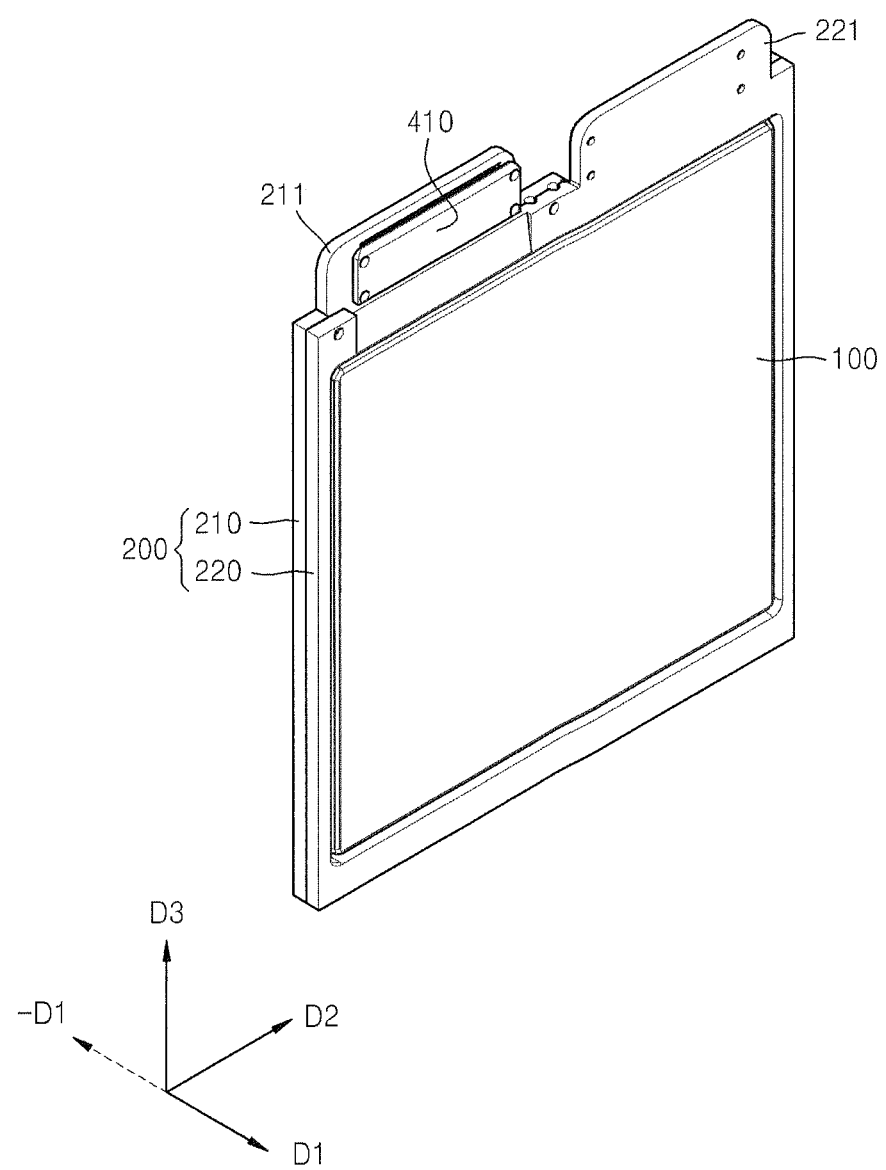
FIG. 1 is a perspective view of a battery pack according to an embodiment of the present invention.

The present invention will now be described more fully with reference to the accompanying drawings, in which exemplary embodiments of the present invention are shown. The present invention may, however, be embodied in many different forms and should not be construed as being limited to the embodiments set forth herein; rather, these embodiments are provided so that this disclosure will be thorough and complete, and will fully convey the present invention to those of ordinary skill in the art. As those skilled in the art would realize, the described embodiments may be modified in various different ways, all without departing from the spirit or scope of the principles for the present invention.

Furthermore, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, a process, an operation, a component, and/or groups thereof, not excluding the existence of one or more other recited forms, one or more other processes, one or more other operations, one or more other components and/or groups thereof While terms "first" and "second" are used to describe various components, parts, regions, layers and/or portions, it is obvious that the components, parts, regions, layers and/or portions are not limited to the terms "first" and "second". The terms "first" and "second" are used only to distinguish between each of components, each of parts, each of regions, each of layers and/or each of portions. Thus, throughout the specification, a first component, a first part, a first region, a first layer or a first portion may indicate a second component, a second part, a second region, a second layer or a second portion without conflicting with the present invention. Like reference numerals denote like elements.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 2:
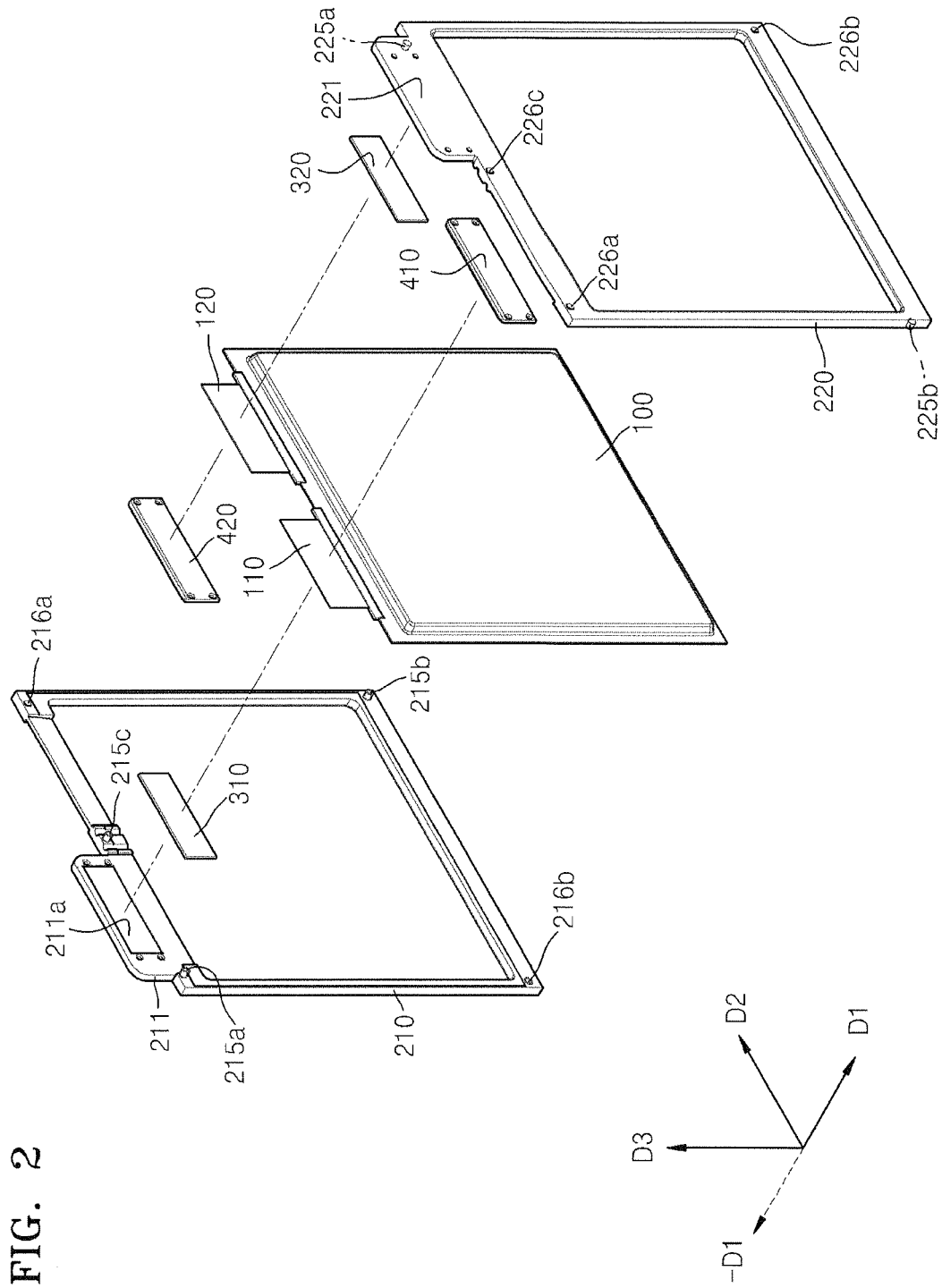
FIG. 2 is an expanded perspective view of the battery pack of FIG. 1.

FIG. 1 is a perspective view of a battery pack according to an embodiment of the present invention. FIG. 2 is an expanded perspective view of the battery pack of FIG. 1.

Referring to FIGS. 1 and 2, the battery pack includes a battery cell 100 and a case 200 housing the battery cell 100, and the case 200 includes a first case 210 and a second case 220 that may be disposed to be symmetrical with respect to the battery cell 100.

The battery cell 100 includes a pair of electrode terminals formed of a positive electrode terminal 110 and a negative electrode terminal 120. The electrode terminals 110 and 120 may be projected in a direction D3 of the battery cell 100, and have a predetermined width. The battery cell 100 is a secondary battery including a nickel-cadmium battery, a nickel-hydride battery, a lithium-ion battery, a lithium-polymer battery, or the like which can be charged and recharged.

The case 200 houses the battery cell 100, and the positive electrode terminal 110 and the negative electrode terminal 120 may project from the case 200 so that an exposed surface of the positive electrode terminal 110, and an exposed surface of the negative electrode terminal 120 face in opposite directions. For this exposure, the case 200 includes the first case 210 and the second case 220 that may be coupled to each other by having the battery cell 100 interposed therebetween. The case 200 may be formed of an electrically insulating material.

The first case 210 has a quadrangular shape and is disposed to surround one side of the battery cell 100. The first case 210 may have a frame shape one side of which is open, and may house an edge of the battery cell 100. For coupling with the second case 220, which will be described later, the first case 210 includes a plurality of bosses 215a, 215b, and 215c, and holes 216a and 216b. The first case 210 also includes a first terminal guide unit 211 so as to expose one surface of the positive electrode terminal 110 of the battery cell 100 to the outside.

The first terminal guide unit 211 includes a receiving surface 211a that has a plate shape with a predetermined width and that receives the positive electrode terminal 110 of the battery cell 100. One surface of the positive electrode terminal 110 is disposed to face the receiving surface 211a, so that the one surface is not externally exposed and the other surface of the positive electrode terminal 110 is externally exposed. Hereinafter, for convenience of description, the one surface of the positive electrode terminal 110 which is disposed to face the first terminal guide unit 211 is referred to as a 'non-exposed surface', and the other surface is referred to as an 'exposed surface'.

A first cushion part 310 may be arranged between the non-exposed surface of the positive electrode terminal 110, and the receiving surface 211a of the first terminal guide unit 211. For example, the positive electrode terminal 110 may be thin and may have a thickness of several mm. When an external shock is applied to the thin positive electrode terminal 110, the positive electrode terminal 110 contacts the first terminal guide unit 211 having predetermined rigidity such that the positive electrode terminal 110 may be damaged by being torn or scratched. The first cushion part 310 may mitigate the external shock by having a predetermined elasticity, so that the first cushion part 310 prevents the positive electrode terminal 110 from being damaged. For this prevention, the first cushion part 310 may be formed of an elastic material such as silicon. Since the first cushion part 310 is not arranged to electrically conduct, the first cushion part 310 has insulation. The first cushion part 310 may have a heat-resistance so as to resist heat generated in the positive electrode terminal 110.

The first cushion part 310 functions to support the positive electrode terminal 110 so as to increase a contact area between the exposed surface of the positive electrode terminal 110 and a first conductive plate 410. As will be described later, the first conductive plate 410 may contact with the exposed surface of the positive electrode terminal 110. In order to smooth heat dissipation as well as conduction, it is better that the contact area between the exposed surface of the positive electrode terminal 110 and the first conductive plate 410 be enlarged, and for this, the first cushion part 310 supports the positive electrode terminal 110 at its rear side. The contact area between the positive electrode terminal 110 and the first conductive plate 410 increases due to the first cushion part 310.

The first conductive plate 410 may be disposed to contact with the exposed surface of the positive electrode terminal 110. The first conductive plate 410 may conduct electricity, and function as a connector when battery packs may be connected in series or in parallel.

The first conductive plate 410 may increase a heat capacity by being manufactured to form a plate type having a wide width and height. Heat generated in the positive electrode terminal 110 may be efficiently dissipated via the first conductive plate 410 having the large heat capacity. The first conductive plate 410 may be formed of metal such as copper (Cu) whose thermal conductivity and electroconductivity may be relatively large. The first conductive plate 410 may be coupled to the first terminal guide unit 211 by using a screw while the first conductive plate 410 contacts the exposed surface of the positive electrode terminal 110.

The second case 220 has a quadrangular shape, is disposed to surround the other side of the battery cell 100, and then is coupled to the first case 210. The second case 220 may also have a frame shape one side of which is open, and may house an edge of the battery cell 100.

The second case 220 includes a plurality of bosses 225a and 225b, and holes 226a, 226b, and 226c so as to enable coupling to the first case 210. Here, the bosses 225a and 225b of the second case 220 correspond to the holes 216a and 216b of the first case 210, and the holes 226a, 226b, and 226c of the second case 220 correspond to the bosses 215a, 215b, and 215c of the first case 210. The bosses 215a, 215b, 215c, 225a and 225b have a column shape projecting toward an inside of each of the first and second cases 210 and 220. A cross-sectional area of the holes 216a, 216b, 226a, 226b, and 226c is the same as a cross-sectional area of the bosses 215a, 215b, 215c, 225a and 225b, and a depth of the holes 216a, 216b, 226a, 226b, and 226c may be equal to or greater than a height of the bosses 215a, 215b, 215c, 225a and 225b. The second case 220 includes a second terminal guide unit 221 so as to expose one surface of the negative electrode terminal 120 of the battery cell 100 the outside.

The second terminal guide unit 221 includes a receiving surface 221a that has a predetermined width and that receives the negative electrode terminal 120 of the battery cell 100. One surface of the negative electrode terminal 120 is disposed to face the receiving surface 221a, so that the one surface is not exposed externally and the other surface of the negative electrode terminal 120 is exposed externally. Hereinafter, for convenience of description, the one surface of the negative electrode terminal 120 which is disposed to face the second terminal guide unit 221 is referred to as 'non-exposed surface', and the other surface is referred to as 'exposed surface'.

The receiving surface 211a of the first terminal guide unit 211 for receiving the positive electrode terminal 110 is in a direction D1, whereas the receiving surface 221a of the second terminal guide unit 221 for receiving the negative electrode terminal 120 is in a direction −D1 that is opposite to the direction D1. Due to structures and coupling of the first and second cases 210 and 220 including the first and second terminal guide units 211 and 221, surfaces of the positive electrode terminal 110 and the negative electrode terminal 120 may be exposed in opposite directions. Thus, during a battery pack manufacturing procedure, it is possible to prevent an accident due to a short-circuit that may occur when a conductor (not shown) accidently contacts the positive electrode terminal 110 and the negative electrode terminal 120.

A second cushion part 320 is arranged between the non-exposed surface of the negative electrode terminal 120, and the receiving surface 221a of the second terminal guide unit 221, so that the second cushion part 320 prevents the negative electrode terminal 120 from being damaged, and supports the negative electrode terminal 120 so as to increase a contact area between the non-exposed surface of the negative electrode terminal 120 and a second conductive plate 420. Similar to the first cushion part 310, the second cushion part 320 may include a material such as heat-resistant silicon having insulation, heat-resistance, and elasticity properties.

The second conductive plate 420 is disposed to contact the exposed surface of the negative electrode terminal 120. The second conductive plate 420 may increase a heat capacity by being formed to have the same width and height as the negative electrode terminal 120. Heat generated in the negative electrode terminal 120 may be efficiently dissipated via the second conductive plate 420. Similar to the first conductive plate 410, the second conductive plate 420 may be formed of metal such as copper (Cu) whose thermal conductivity and electroconductivity may be relatively large. The second conductive plate 420 may be coupled to the second terminal guide unit 221 by using a screw.

In the present embodiment, the first and second cases 210 and 220 have a frame shape whose center portion is open but are not limited thereto. For example, center portions of the first and second cases 210 and 220 may not be open but may have closed surfaces or may have surfaces whereon a plurality of openings may be formed.

In the present embodiment, the first and second conductive plates 410 and 420 are assembled as a connector for connecting battery packs in series or in parallel. However, the connector is not limited thereto in the present embodiment. For example, the battery packs may be connected in series or in parallel by using a clip-shaped connector or a wire.

Figure 3:
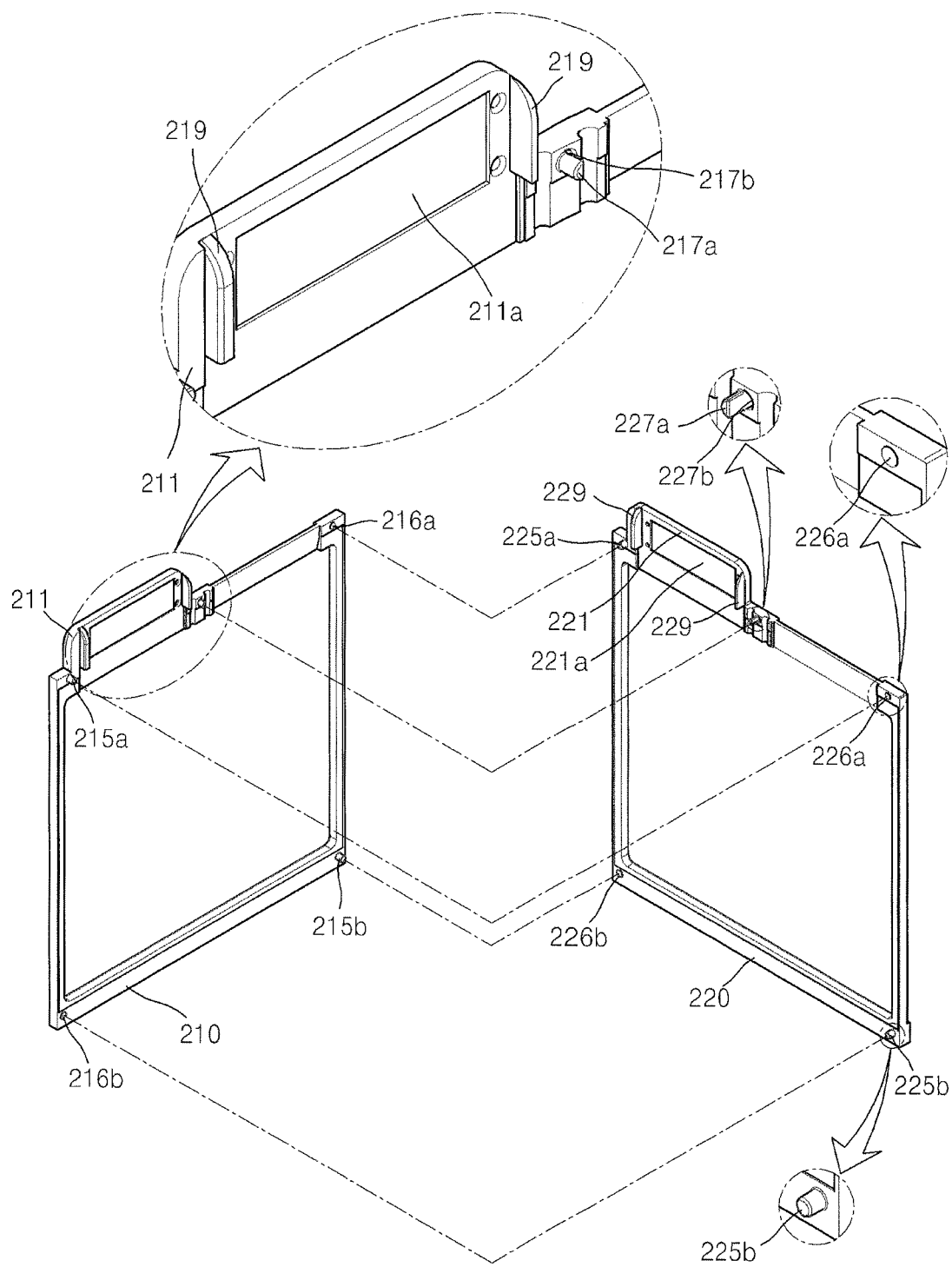
FIG. 3 is a perspective view of a battery pack according to another embodiment of the present invention, where a battery cell is omitted and only first and second cases are illustrated.

FIG. 3 is a perspective view of a battery pack according to another embodiment of the present invention, and for convenience of description, FIG. 3 omits a battery cell 100 and only illustrates first and second cases 201 and 220.

The battery pack according to the present embodiment includes the battery cell 100 having a pair of electrode terminals formed of a positive electrode terminal 110 and a negative electrode terminal 120. A configuration of the battery cell 100 is the same as that of a battery cell 100 described above with reference to FIGS. 1 and 2.

Similar to the previous embodiment described above, a first case 210 and a second case 220 may be coupled to each other by having the battery cell 100 interposed therebetween, and the cases 210 and 220 include terminal guide units 211 and 221, respectively, so as to allow the electrode terminals 110 and 120 to be exposed in different directions. Also, respective cushion parts 310 and 320, and respective conductive plates 410 and 420 may be included in the electrode terminals 110 and 120.

However, the present embodiment is different in that protrusion parts 219 and 229 are further included in the terminal guide units 211 and 221, and may be disposed in a similar manner that bosses 215a, 215b, 225a, and 226b and holes 216a, 216b, 226a, and 226b may be disposed to couple the first case 210 and the second case 220. Hereinafter, for convenience of description, the difference thereof will be further described.

First, the protrusion parts 219 and 229 formed in the terminal guide units 211 and 221 will now be described.

The terminal guide units 211 and 221 include receiving surfaces 211a and 221a for receiving the electrode terminals 110 and 120, and the protrusion parts 219 and 229 may be formed at side ends of the receiving surfaces 211a and 221a. The protrusion parts 219 and 229 protrude along exposed directions of the electrode terminals 110 and 120, and a height of the protrusion parts 219 and 229 may be equal to or greater than a sum of a thickness of the electrode terminals 110 and 120 and a thickness of the cushion parts 310 and 320.

The protrusion parts 219 and 229 protect the electrode terminals 110 and 120 and/or the conductive plates 410 and 420 in side directions, so that the protrusion parts 219 and 229 prevent an accident in which the electrode terminals 110 and 120, and the conductive plates 410 and 420 are accidently short-circuited by a conductor (not shown). As described above with reference to FIGS. 1 and 2, the terminal guide units 211 and 221 withdraw the electrode terminals 110 and 120 in such a manner that an exposed surface of the positive electrode terminal 110 and an exposed surface of the negative electrode terminal 120 may be arranged in opposite directions, so that it is possible to prevent an accident due to a short-circuit. In addition to this prevention, since the protrusion parts 219 and 229 may be arranged, an accident due to a short-circuit may be more efficiently prevented. The protrusion parts 219 and 229 include an insulating material. For example, the protrusion parts 219 and 229 may be separately manufactured and then fixed to the terminal guide units 211 and 221, or may be injection-molded by using the same material as the first and second cases 210 and 220.

In the present embodiment, each of the protrusion parts 219 and 229 is arranged at both sides of each of the terminal guide units 211 and 221, but the arrangement is not limited thereto. For example, each of the protrusion parts 219 and 229 may be arranged at only one side of each of the terminal guide units 211 and 221.

Next, a disposal state of the bosses 215a, 215b, 225a, and 226b and the holes 216a, 216b, 226a, and 226b will now be described.

Referring to FIG. 3, the first case 210 and the second case 220 according to the present embodiment have the same shapes. For example, two cases may be formed by using the same mold, and one of the two cases becomes the first case 210 and the other one becomes the second case 220.

The bosses 215a and 215b and the holes 216a and 216b of the first case 210 may be formed to be symmetrical with respect to a longitudinal axis of the first case 210. That is, if the boss 215a is formed on an upper left corner of the first case 210, the hole 216a is formed on an upper right corner, and if the hole 216b is formed on a lower left corner, the boss 215b is formed on a lower right corner.

Since the second case 220 has the same shape as the first case 210, the bosses 225a and 225b and the holes 226a and 226b of the second case 220 may be formed to be symmetrical with respect to a longitudinal axis of the second case 220. That is, if the boss 225a is formed on an upper left corner of the second case 220, the hole 226a is formed on an upper right corner, and if the hole 226b is formed on a lower left corner, the boss 225b is formed on a lower right corner. Since the first case 210 and the second case 220 may be formed by using the same mold, the bosses 225a and 225b and the holes 226a and 226b of the second case 220 may be substantially the same as the bosses 215a and 215b and the holes 216a and 216b of the first case 210.

Since an inner surface of the first case 210 and an inner surface of the second case 220 are disposed to face each other by having the battery cell 100 interposed therebetween, the first case 210 and the second case 220 may be positioned so that their left and right sides may be inverse to each other. That is, a case in which the left and right sides of the first case 210 may be reversed is the second case 220. By disposing the first case 210 and the second case 220 whose left and right sides may be inverse to each other, the receiving surface 211a of the first terminal guide unit 211, and the receiving surface 221a of the second terminal guide unit 221 may be exposed in opposite directions. Also, the bosses 215a, 215b, 225a, and 226b and the holes 216a, 216b, 226a, and 226b may be disposed to correspond to each other, so that the first case 210 and the second case 220 may be coupled to each other.

Referring to FIG. 3, the first case 210 may include a half-boss 217a and a half-hole 217b, and the second case 220 may include a half-boss 227a and a half-hole 227b. With respect to the half-boss 217a and the half-hole 217b formed on the first case 210, the half-boss 217a has a shape obtained by halving one of the bosses 215a and 215b, and the half-hole 217b may be formed to have a height equal to or greater than a height of the half-boss 217a while the half-hole 217b has the same shape as a cross-sectional area of the half-boss 217a. For example, the half-boss 217a may have a column shape whose cross-sectional area is semi-circular, and the half-hole 217b may have a semi-circular cross-sectional area. The half-boss 227a and the half-hole 227b formed on the second case 220 have the same shape as those of the half-boss 217a and the half-hole 217b formed on the first case 210.

In the present embodiment, the cross-sectional areas of the half-bosses 217a and 227a and the half-holes 217a and 227b may be semi-circular. However, a shape of the cross-sectional areas is not limited thereto as long as the cross-sectional areas of the half-bosses 217a and 227a and the half-holes 217a and 227b may be the same.

Since the first case 210 and the second case 220 may be disposed in such a manner that their left and right sides are inverse to each other, the half-boss 217a of the first case 210 corresponds to the half-hole 227b of the second case 220, and the half-hole 217b of the first case 210 corresponds to the half-boss 227a of the second case 220, so that the first case 210 and the second case 220 may be coupled to each other by insertion of the half-boss 217a and the half-hole 227b, and the half-hole 217b and the half-boss 227a.

The half-bosses 217a and 227a and the half-holes 217b and 227b may be disposed in an axial line that passes each center point of the cases 210 and 220 and is straight in a longitudinal direction. For example, the half-holes 217b and 227b may be formed in one side of an axis, and the half-bosses 217a and 227a may be formed in the other side of the axis.

FIGS. 4 through 9 are perspective views for illustrating a procedure for assembling the battery pack of FIG. 3, and focus on a portion of the terminal guide units 211 and 221.

Figure 4:
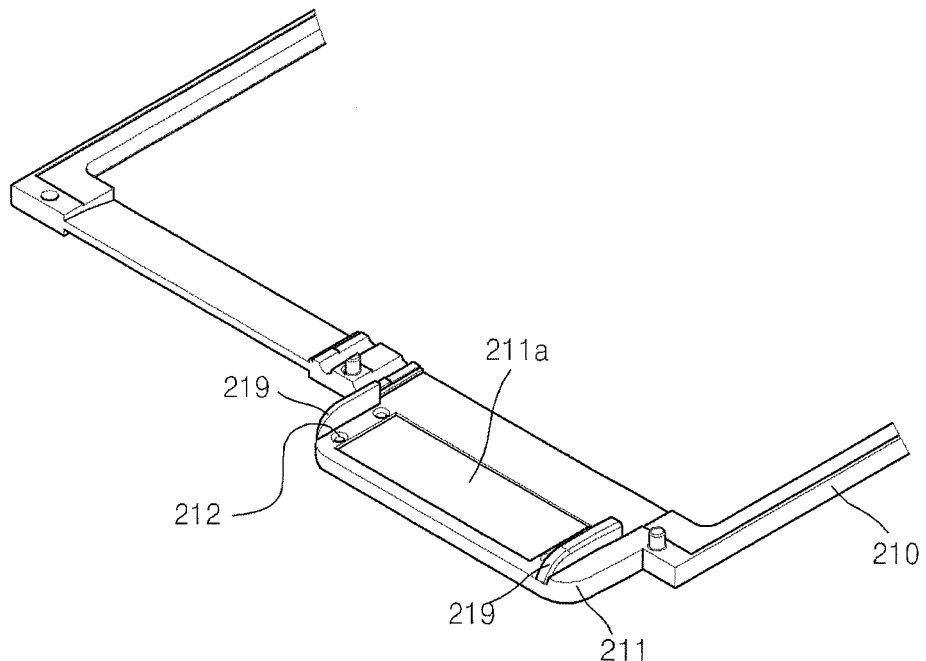
FIGS. 4 through 9 are perspective views partially illustrating a procedure for assembling the battery pack of FIG. 3.

Referring to FIG. 4, the first case 210 including the first terminal guide unit 211 is disposed. The receiving surface 211a of the first terminal guide unit 211 has a size sufficient to receive the positive terminal electrode 110, and the protrusion part 219 is arranged at both sides of the receiving surface 211a.

Figure 5:
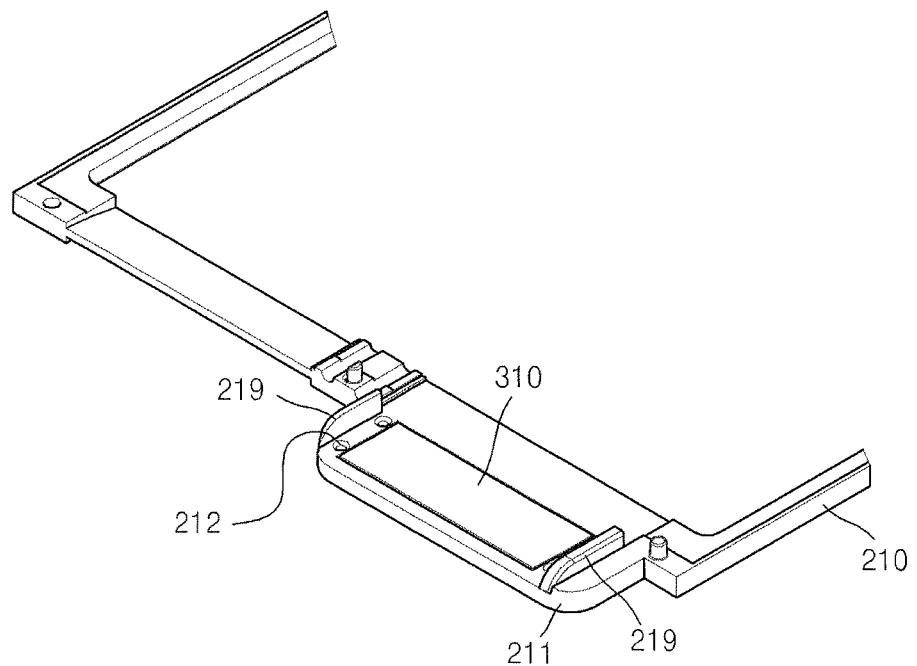

Referring to FIG. 5, the first cushion part 310 is first disposed on the receiving surface 211a of the first terminal guide unit 211. The receiving surface 211a may be slightly stepped so as to allow the first cushion part 310 to be placed. For example, the first cushion part 310 may be fixed at the first terminal guide unit 211 by using a heat-resistant adhesive.

Figure 6:
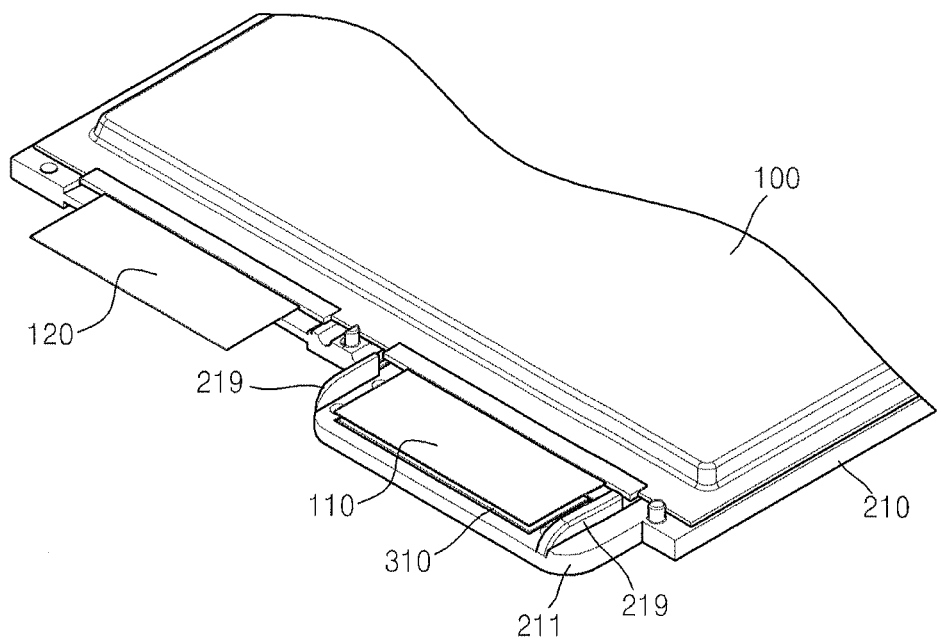

Referring to FIG. 6, the battery cell 100 is located in the first case 210. At this time, the positive terminal electrode 110 is placed in the first case 210. The first case 210 only includes the first terminal guide unit 211 for the positive terminal electrode 110, so that the negative terminal electrode 120 is not in contact with the first case 210.

Figure 7:
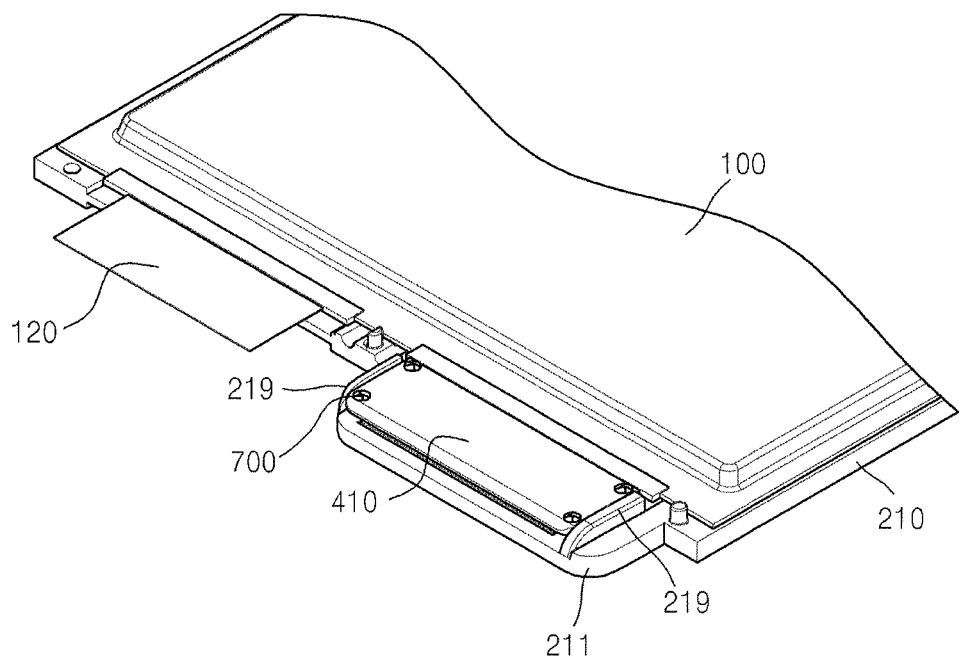

Referring to FIG. 7, the first conductive plate 410 is arranged on an exposed surface of the positive terminal electrode 110. Since the first cushion part 310 supports the positive terminal electrode 110, a contact area between the positive terminal electrode 110 and the first conductive plate 410 increases. And heat capacity of the first conductive plate 410 may be large, so that heat generated in the positive terminal electrode 110 may be efficiently dissipated via the first conductive plate 410.

The first conductive plate 410 may be fixed at the first case 210 by using a screw 700. The screw 700 passes through a via hole formed in the first conductive plate 410, and then is coupled to a screw-coupling groove 212 (see FIG.4 or 5) formed in the first case 210. A screw thread for coupling the screw 700 is formed in the screw-coupling groove 212.

In another example, electrodes of a battery pack may be connected in series or in parallel by using a clip-shaped connector, instead of using the first conductive plate 410. In this case, the aforementioned screw coupling procedure may be omitted.

Figure 8:
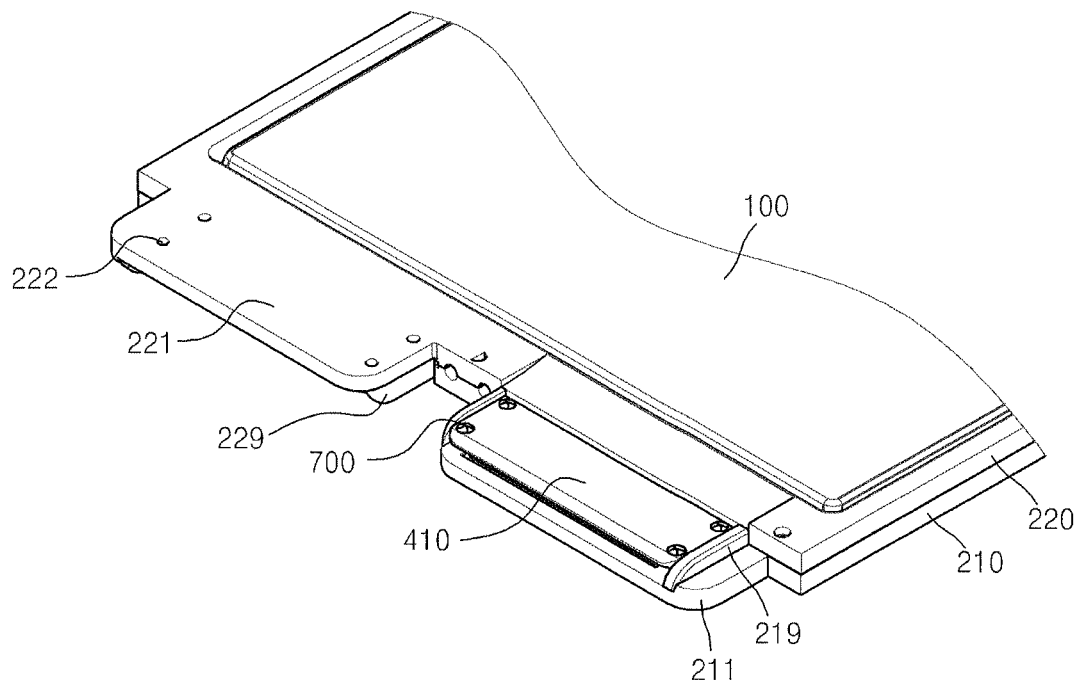

Referring to FIG. 8, the second case 220 is disposed on the battery cell 100, and then the first case 210 and the second case 220 may be coupled to each other. As described above with reference to FIG. 3, the bosses 215a, 215b, 225a, and 226b and the holes 216a, 216b, 226a, and 226b, and the half-bosses 217a and 227a and the half-holes 217b and 227b may be formed on the first and second cases 210 and 220, so that the first case 210 and the second case 220 may be coupled to each other.

Here, the second cushion part 320 is fixed on the receiving surface 221a of the second terminal guide unit 221 arranged in the second case 220, in a same manner as described above with reference to FIG. 5. By coupling between the first case 210 and the second case 220, the negative terminal electrode 120 is placed in the second terminal guide unit 221 of the second case 220. That is, the negative terminal electrode 120 contacts the second cushion part 320.

Figure 9:
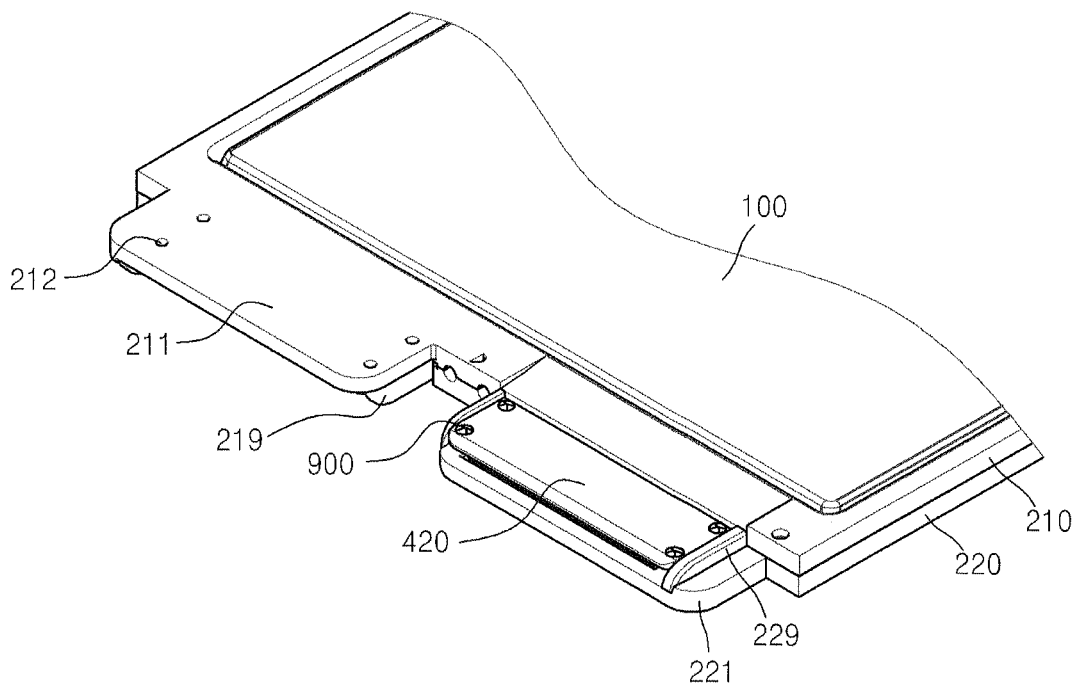

Referring to FIG. 9, the battery pack in an assembled state shown in FIG. 8 is turned upside down, and then is disposed so that the second conductive plate 420 contacts an exposed surface of the negative terminal electrode 120. As is done with the first conductive plate 410, the second conductive plate 420 may be fixed at the second case 220 by using a screw 900.

As described above, according to embodiments of the present invention, the positive terminal electrode 110 and the negative terminal electrode 120 may be exposed in different directions, so that it is possible to effectively prevent an accident due to a short-circuit between terminals. Furthermore, the first case 210 and the second case 220 may be injection-molded by using a mold, so that manufacturing costs and time are significantly reduced.

Also, the first case 210 and the second case 220 may be coupled to each other by using the bosses 215a, 215b, 215c, 225a, and 226b and the holes 216a, 216b, 226a, 226b, and 226c, and/or the half-bosses 217a and 227a and the half-holes 217b and 227b, so that it is simple to perform an assembling operation.

Figure 10:
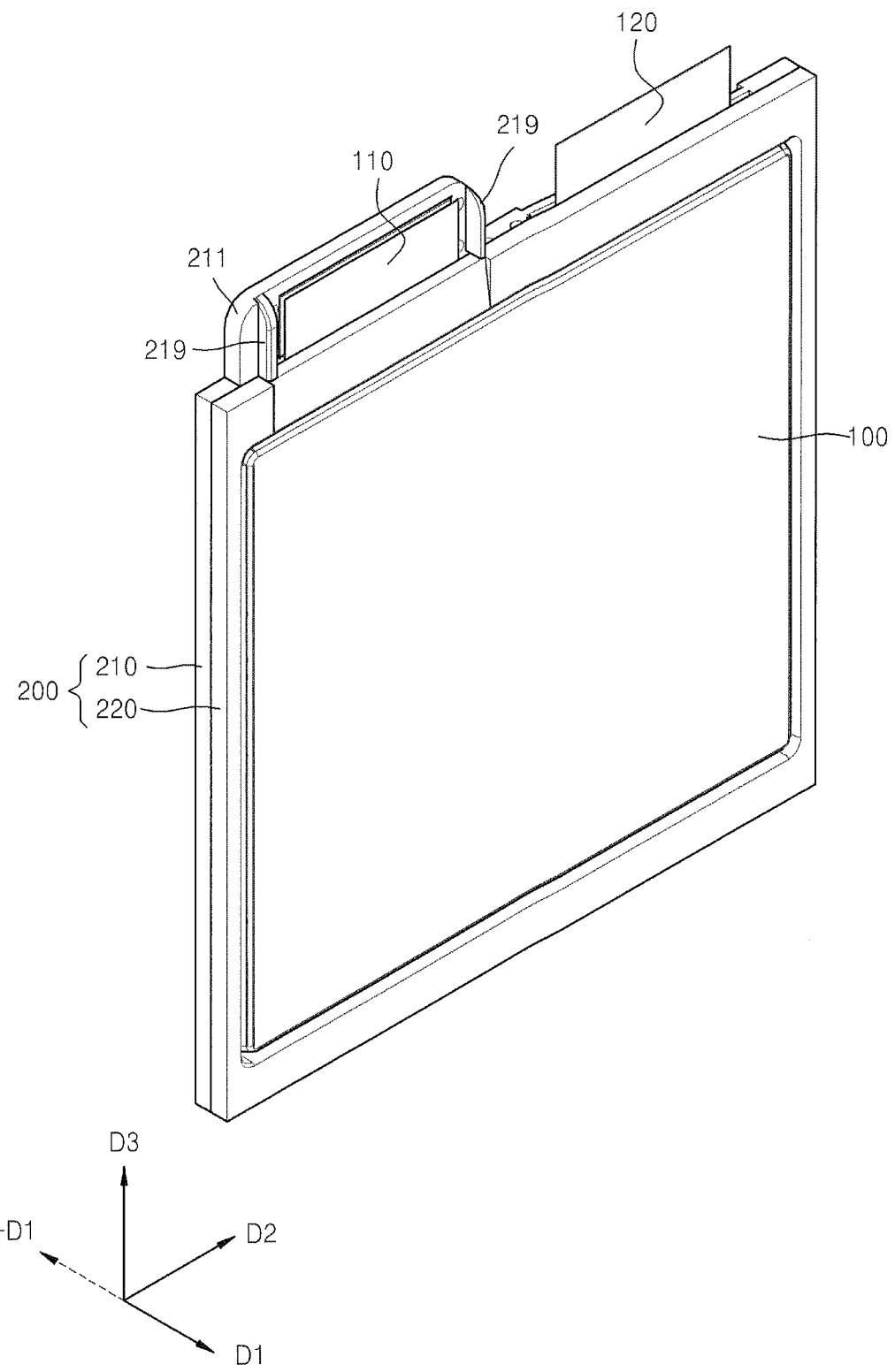
FIG. 10 is a perspective view of a battery pack according to another embodiment of the present invention.

FIG. 10 is a perspective view of a battery pack according to another embodiment of the present invention. The battery pack according to the present embodiment includes a battery cell 100 including a pair of electrode terminals formed of a positive electrode terminal 110 and a negative electrode terminal 120, and is similar to the battery pack according to the previous embodiment in that a case 200 houses the battery cell 100. Thus, hereinafter, differences therebetween will now be described.

Referring to FIG. 10, one side of the positive electrode terminal 110 of the battery cell 100 is insulated by a first terminal guide unit 211 whereas both sides of the negative electrode terminal 120 are exposed. Protrusion parts 219 may be arranged at sides of the positive electrode terminal 110 so as to prevent a short between the positive electrode terminal 110 and the negative electrode terminal 120. The protrusion part 219 that is arranged adjacent to the negative electrode terminal 120 and that is from among the protrusion parts 219 arranged at the sides of the positive electrode terminal 110 prevents a short occurring when a conductive body falls between the positive electrode terminal 110 and the negative electrode terminal 120.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery pack, comprising:
a battery cell having a first electrode terminal extending from a side of the battery cell and a second electrode terminal extending from the side of the battery cell;
a case comprising a first case and a second case, the first case and the second case are coupled together with the battery cell positioned between the first case and the second case, the first case comprises a first terminal guide unit extending from a side of the first case, the first terminal guide unit accommodates the first electrode terminal, the first electrode terminal having a first surface and a second surface directly opposite to the first surface, the first surface faces the first terminal guide unit such that the first surface is a non-exposed surface and the second surface is an exposed surface; and
a second terminal guide unit to accommodate the second electrode terminal, the second terminal guide unit extends from a side of the second case, the second electrode terminal having a third surface and a fourth surface directly opposite to the third surface, the second terminal guide unit faces the third surface such that the third surface is a non-exposed surface and the fourth surface is an exposed surface, the first terminal guide unit and the second terminal guide unit face in opposite directions to each other with the fourth surface of the second electrode terminal and the second surface of the first electrode terminal face opposite direction to each other.

2. The battery pack recited in claim 1, wherein the first terminal guide unit includes a protrusion part extending from an end of the first terminal guide unit and that protrudes along an exposed direction of a side of the first electrode terminal at a height approximately equal to or greater than a thickness of the first electrode terminal, wherein the protrusion part is disposed at an end of the first terminal guide unit closest to the second electrode terminal.

3. The battery pack recited in claim 2, wherein the first terminal guide unit includes a second protrusion part extending from an end of the first terminal guide unit and that protrudes along an exposed direction of a side of the first electrode terminal at a height approximately equal to or greater than a thickness of the first electrode terminal, wherein the second protrusion part is disposed at an end of the first terminal guide unit furthest from the second electrode terminal.

4. The battery pack recited in claim 1, wherein the first terminal guide unit of the first case includes a receiving surface to accommodate a first cushion part, said first cushion part is composed of a non-conductive material, said first cushion part faces and comes in contact with the non-exposed surface of the first electrode terminal.

5. The battery pack recited in claim 1, wherein the second terminal guide unit of the second case includes a receiving surface to accommodate a second cushion part, said second cushion part are composed of a non-conductive material, said second cushion part faces and comes in contact with the non-exposed surface of the second electrode terminal 6. The battery pack recited in claim 1, further comprising:
a first conductive plate coupled to the exposed surface of the first electrode terminal,
wherein the first conductive plate is composed of a material that conducts electricity and absorbs and dissipates heat.

7. The battery pack recited in claim 1, further comprising:
a second conductive plate coupled to the exposed surface of the second electrode terminal,
wherein the second conductive plate is composed of a material that conducts electricity and absorbs and dissipates heat.

8. The battery pack recited in claim 4, wherein the first cushion part is composed of a material having heat-resistant and elastic properties.

9. The battery pack recited in claim 5, wherein the second cushion part is composed of a material having heat-resistant and elastic properties.

10. The battery pack recited in claim 8, wherein the first cushion part is composed of silicon.

11. The battery pack recited in claim 9, wherein the second cushion part is composed of silicon.

12. The battery pack recited in claim 6, wherein the first conductive plate is composed of copper.

13. The battery pack recited in claim 7, wherein the second conductive plate is composed of copper.

14. The battery pack recited in claim 1, wherein the second terminal guide unit includes a protrusion part extending from an end of the second terminal guide unit and that protrudes along an exposed direction of a side of the second electrode terminal at a height approximately equal to or greater than a thickness of the second electrode terminal, wherein the protrusion part is disposed at an end of the second terminal guide unit closest to the first electrode terminal.

15. The battery pack recited in claim 14, wherein the second terminal guide unit, further comprises:

a second protrusion part extending from an end of the second terminal guide unit and that protrudes along an exposed direction of a side of the second electrode terminal at a height approximately equal to or greater than a thickness of the second electrode terminal, said second protrusion part is disposed at an end of the second guide unit furthest from the first electrode terminal.

16. The battery pack recited in claim 6, wherein the first conductive plate is screw-engaged to the first terminal guide unit.

17. The battery pack recited in claim 7, wherein the second conductive plate is screw-engaged to the second terminal guide unit.

18. The battery pack recited in claim 1, wherein the first case and the second case are a same shape.

* * * * *